US005365044A

United States Patent [19]

Hesshaus

[11] Patent Number: 5,365,044
[45] Date of Patent: Nov. 15, 1994

[54] POSTAGE METER STRIP PRINTING MACHINE

[75] Inventor: Werner Hesshaus, Berlin, Germany
[73] Assignee: Francotyp-Postalia GmbH, Berlin, Germany

[21] Appl. No.: 859,740
[22] PCT Filed: Oct. 16, 1991
[86] PCT No.: PCT/EP91/01971
§ 371 Date: Jun. 15, 1992
§ 102(e) Date: Jun. 15, 1992
[87] PCT Pub. No.: WO92/07338
PCT Pub. Date: Apr. 30, 1992
[30] Foreign Application Priority Data
Oct. 16, 1990 [DE] Germany ............ 4033164
[51] Int. Cl.[5] ............ G06F 15/20
[52] U.S. Cl. ............ 235/375; 235/380; 235/492
[58] Field of Search ............ 235/375, 380, 492; 364/464.03

*Primary Examiner*—Harold Pitts

[57] ABSTRACT

The postage meter strip printing machine disclosed comprises a housing (1) with a printing mechanism, processor system, read/write device and controls (4, 5) and is operated by means of a postage credit card (2). The credit card is used not only to monitor the postal charges but also to enable an advertising cliché to be identified, read off and stored.

4 Claims, 1 Drawing Sheet

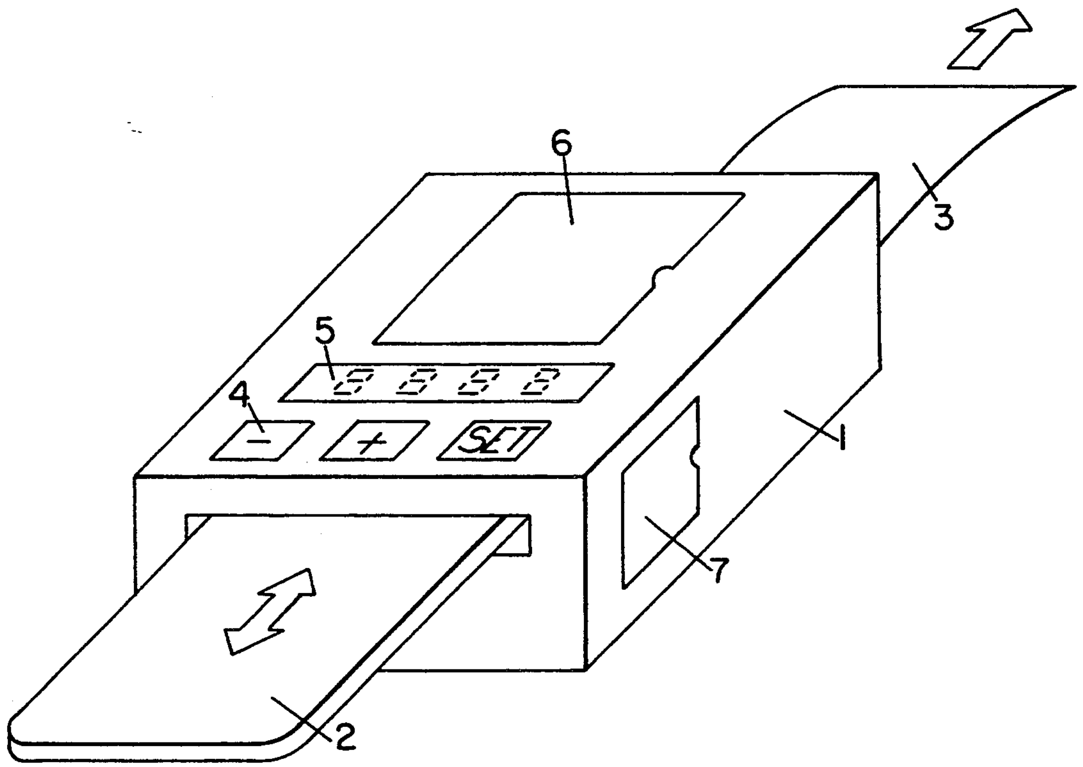
6
3
5
4
-
+
SET
1
7
2

POSTAGE METER STRIP PRINTING MACHINE

FIELD OF THE INVENTION

The invention concerns a postage meter strip printing machine with credit card charging which prints onto a postage strip a date, a postage value and an advertising cliché.

BACKGROUND OF THE INVENTION

Postage fee accounting machines working on the basis of credit card charging are known. German Patent Publication DE 39 03 718 A1 describes such a system in which an electronic postage meter is enabled for the printing of postage by an IC card read/write unit and a control unit. In this case data concerning the expended amount of money and the number of printings are stored on the IC card. Therefore, different persons with their own IC cards and/or firms can use the postage meter in common, in order to decrease the initial and maintenance costs. Reliability of the fee accounting is assured by the expensive accounting system integrated into the postage meter.

This common usage is relatively time consuming, if for example the postage meter is engaged by one user and for the next user becomes again available only after a long waiting time or if access to the postage meter has travel time associated with it.

SUMMARY OF THE INVENTION

The invention has as its object the provision of a postage meter with credit card charging which is as economical in acquisition and maintenance as a postage meter with credit card control, which is therefore usable for small enterprises, which can also be adjusted for use by a number of other users, and which assures a reliable fee accounting for the user and for the Post Office.

This object is solved by the invention as set forth in the characterizing portion of the first claim.

The dependent claims describe further advantageous developments.

BRIEF DESCRIPTION OF THE DRAWING

In the following the invention is described in more detail with regard to one drawing. The drawing shows the principle construction of the postage meter strip printing machine.

DESCRIPTION OF THE PREFERRED EMBODIMENTS

A printing mechanism, a processor system, a read/write device for credit cards, an operating mechanism and a refillable strip supply container are accommodated in a common housing 1 of the machine. Two openings for the insertion of a special postage credit card 2 and for the dispensing of the strip 3, and an opening 6 for refilling the strip supply container, are the only outer accesses to the machine. These accesses are screened reliably with respect to the processor system and the printing mechanism.

In another embodiment a further opening 7 is provided for the reception of energy sources, for example, batteries or rechargeable accumulators for a mains independent drive.

The loading of the postage credit card is carried out by an institution authorized to do so, for example, the manufacturer of the machine or a postal authority. This institution is equipped with a corresponding read/write unit for the postal credit card and carries out the accounting between the card owner and the postal service of the amounts loaded onto the postage credit card.

The processor system is the connecting member between the printing mechanism and the read/write device and is connected with them by information and signal conductors. Digital data for identification, fee calculation, and digital data for the individual advertising clichés stored on the postage credit card are exchanged between the processor system and the read/write device. From the processor system control data for the printing of the individual advertising clichés, data for the postage fee value to be printed, and for the date is sent over the information conductors to the printing mechanism. The signal conductors between the devices serve for the transmission of control and security data.

The printing mechanisms used are preferably such as operate without type and which are therefore able to print the different advertising fields stored on the postage credit card. These are preferably flat bed matrix or thermal transfer printers.

The operating mechanism consists of a keyboard 4 for the input of the postage value to be printed and an indicator, for example, a display 5. It is so connected with the processor system that the input of the postage value to be printed can be accomplished only incrementally or decrementally in the minimum step of the value range of the effective postage fee table, proceeding from one standard postage value or from the last input postage value. The input of the desired postage value takes place by several actuations of the increment or decrement keys of the keyboard 4. When the indicated value finally agrees with the desired postage value, it is validated by actuation of the "SET" key.

The postage credit card inserted in the postage meter strip printing machine is connected electrically with the read/write device so that data can be read into or out of the memory of the card. For the activation of a data transfer a special identification and/or secret code can be used in a known way which is input by the user through the operating mechanism.

In a preferred variant embodiment of the invention the postage credit card contains a processor system, consisting of a processor, a program memory, a volatile data memory and a non-volatile data memory, as well as a serial input-output-interface.

The non-volatile data memory is organized into first and second storage areas. The first storage area contains the information about the actual postage credit value. This storage area is loaded with a postage credit value from which with every printing operation, the corresponding postage value is subtracted until the postage credit is used up and a new loading is required. The second storage area contains the data for the printing of the advertising clichés. The storage areas are separately controllable so that the advertising clichés if necessary are not printed with the postage. In addition, the storage area for the advertising clichés upon a new loading of the postage credit storage area must remain unchanged. The storage area for an advertising cliché is only specially controllable by an apparatus independent from the postage credit providing apparatus when the cliché is set up, changed or erased.

In a variation of the invention the non-volatile memory instead of containing the actual remaining value of the previously loaded postage credit stores the summed amount of the carried out postage printing, which is accounted for in a given cycle between the account of the user and the account of the postal service, with the memory area of the postal credit card at that time being reset to zero.

In a further variation of the invention in addition to the printed postage values their associated dates are registered, which dates are stored in a further area of the non-volatile memory.

The statistical data concerning the carried out postage printing events can upon being printed out serve for example as a daily journal. For this purpose the postage credit card is inserted into an associated reading unit connected with a personal computer. A special program on the software implementing the personal computer reads the associated memory content of the postage credit card and assembles a journal output.

Portable data carriers, such as IC cards, chip cards or similar re-loadable devices are used as the postage credit cards.

I claim:

1. A postage meter strip printing machine and an associated postage credit card for use with said machine for card charging, which machine prints onto a postage strip a date, a postage value and an advertising cliché, said machine having arranged therein, within a common housing, a printing mechanism, a first processor system connected with said printing mechanism via information and signal conductors for transferring control and security data, an operating mechanism, and a read/write device which serves to receive said card and which is connected with said first processor system via information conductors for the exchange of digitized data for identification and for fee calculation, said card containing a second processor system including a processor, a program memory, a volatile data memory, and a non-volatile data memory having an accounting memory for storing the current accounting data, a strip supply container in said common housing, said non-volatile data memory of said second processor system containing a cliché memory for storing the graphic data of an individual advertising cliché of the card user, said cliché memory being write-protected against a change of its data while newly loading postage credit into or resetting the fee register in the accounting memory of said card, and a device independent from the postage credit providing mechanism for writing data into said cliché memory.

2. A postage meter strip printing system according to claim 1 characterized in that said operating mechanism has an increment key, a decrement key and a validation key, which keys are coupled to the processor system of the postage meter strip printing machine in such a way that, by means of several actuations of the keys, starting from a predetermined value, the desired postage value is adjusted in predetermined steps, and is validated.

3. A postage meter strip printing system according to claim 2 characterized in that the starting value for the steps is a standard postage value.

4. A postage meter strip printing system according to claim 2 characterized in that the starting value for the steps is the last postage value to which the machine was set.

* * * * *